United States Patent Office 2,873,697
Patented Feb. 17, 1959

2,873,697

PROCESS FOR MAKING BAKING DOUGH

Hans Strahmann, Wentorf, Post Reinbek, Germany

No Drawing. Application July 24, 1956
Serial No. 599,698

Claims priority, application Germany September 30, 1952

9 Claims. (Cl. 107—54)

The present invention relates to a process of making dough, and more particularly it relates to an improved method of making baking dough as well as other types of dough such are used for noodles, macaronis, wheat-starch dough and the like, in a continuous manner.

The present application is a continuation-in-part of my now abandoned co-pending application Serial No. 382,519, filed on September 28, 1953, and entitled "Process and Apparatus for Making Bread and Pastry Dough."

According to the known methods of kneading dough for all kinds of farinaceous foods, and most important for bread and other baked goods, in nearly all cases a batch of dough is prepared by introducing the dough ingredients required for making the dough, such as flour and water, and also dough ingredients such as salt, yeast, fat, etc., into a kneading vat, and to knead the dough ingredients in the kneading vat until a batch of dough is formed.

The purpose of the kneading of the dough ingredients is to obtain an intimate mixture of these various ingredients. This is of special importance with respect to the flour and water, since for hydrolyzation and for subsequent fermentation a predetermined amount of water absorption by the individual flour particles is required. To obtain complete water absorption on each of the individual flour particles is extremely difficult, since flour does not consist of free starch particles but of larger fragments of the grain kernel which partially adhere to each other in form of colloidal agglomerations. The kneading of the dough ingredients is supposed to achieve that water is brought evenly in contact with each of the flour particles. In spite of the fact that the problem of obtaining maximum water absorption by each of the flour particles is old and well known, it has so far not been possible to devise a satisfactory solution therefor.

Practically all of the known devices in which dough is formed in a batch process have the inherent disadvantage that relatively long kneading periods are required. Depending on the kind of finished product that is to be made, kneading periods in the same devices are of varying length. For instance, the kneading period for rye bread doughs is about twenty-five minutes, and the kneading period for mixed flour and wheat bread doughs is about fifteen minutes.

In spite of great efforts which are reflected in many publications, the baking industry has so far not achieved a process in which for instance bread can be produced satisfactorily in a continuous manner. The main difficulty which so far could not be overcome, was to devise a method in which also the kneading of the dough could be performed in a continuous manner. Consequently, throughout the world bread factories use dough kneading apparatus in which individual batches of dough are prepared. The most modern devices of this kind (so-called high speed dough kneaders) still require in excess of three minutes for preparing a batch of dough.

The dough kneading apparatus as used so far has the further disadvantage that it does not achieve within the periods of time indicated above to so intimately mix flour and water that in the finished bread all individual flour particles are sufficiently decomposed or hydrolyzed. This desired result is not even obtained when after completion of the kneading process the dough is allowed to rest for a period of time which, depending on the type of dough, varies according to German baking practice between about twenty and forty-five minutes.

It is well known that during the kneading of the dough ingredients according to the methods described above, the ripening of the dough commences already while the same is still located within the kneading vat and is being subjected to further kneading action. The start of the ripening process of the dough coincides with the start of the formation of a gluten network therein and with the development of fermentation gas. The continuation of kneading after the formation of the gluten network has started, causes tearing and partial destruction of the same. This might lead to difficulties in the subsequent shaping of the dough and might make it even impossible to shape the dough in the desired manner. Furthermore, a portion of the developing carbon dioxide is squeezed out out of the dough during kneading of the same and consequently is not available for the later raising of the dough.

It is therefore an object of the present invention to overcome the aforementioned disadvantages in conventional dough making processes.

It is a further object of the present invention to provide a dough making process which can be executed satisfactorily in a continuous manner.

It is another object of the present invention to complete the kneading of the dough prior to the start of the ripening process.

It is still another object of the present invention to achieve complete homogenization of all individual flour particles with all of the water and other ingredients of the dough.

It is yet another object of the present invention to provide a method of continuously making baking dough wherein maximum water absorption by each individual flour particle is obtained.

Other objects and advantages of the present invention will become apparent from a further reading of the description and the appended claims.

With the above and other objects in view, the present invention consists in a method of continuously making dough from dough ingredients including flour, water, and other ingredients, comprising the steps of continuously introducing the dough ingredients including predetermined amounts of flour, water and other ingredients into a continuous mixing and kneading apparatus, the predetermined amount of water thus being introduced into the continuous mixing and kneading apparatus being equal to the maximum amount of water that may be mixed and kneaded with the flour and the other ingredients in a conventional batch dough making operation so as to obtain a proper dough, plus between about 4 and 6 liters of water per each 100 kg., of the flour, mixing and kneading, the dough ingredients in the continuous mixing and kneading apparatus at such speed and with such intensity as to achieve complete mixing and homogenization of the dough ingredients within a period of less than one minute, and continuously removing the thus formed dough from the continuous mixing and kneading apparatus within less than one minute after introduction of the dough ingredients into the continuous mixing and kneading apparatus, whereby the dough is formed at such speed and with such homogeneity that formation of a gluten network and gas starts substantially only after the dough is removed from the mixing and kneading apparatus, and substantially each flour particle in the dough is saturated with water.

According to a preferred embodiment of the present invention, the same consists in a method of continuously making baking dough from dough ingredients including flour, water and other ingredients, comprising the steps of continuously introducing the dough ingredients including predetermined amounts of flour, water and other ingredients into a continuous mixing and kneading apparatus, the predetermined amount of water thus being introduced into the continuous mixing and kneading apparatus being equal to the quantity of water required for obtaining in a farinograph in combination with the flour and the other ingredients desired predetermined dough development, plus an additional quantity of water of between about 4 and 6 liters per 100 kg. of the flour, mixing and kneading the dough ingredients in the continuous mixing and kneading apparatus at a predetermined optimum dough forming temperature and at such speed and with such intensity as to achieve complete mixing and homogenization of the flour within a period of between about 10 and 40 seconds, continuously removing the thus formed dough from the continuous mixing and kneading apparatus and subdividing the continuously formed baking dough into individual baking portions within about 10 and 40 seconds after introduction of the dough ingredients into the continuous mixing and kneading apparatus, whereby the baking portions are formed at such speed and with such intensity that formation of a gluten network and of gas starts substantially only after the baking portions are formed and substantially each flour particle in the baking dough is saturated with water.

According to the present invention, the amount of water included in the dough ingredients must be such that upon forming a completely homogenized dough from the dough ingredients the water will be evenly distributed upon all of the individual flour particles and will be absorbed by the same so that then the dough will be free of any surplus water which is not absorbed. The presence of free surplus water has to be avoided in order to prevent during the further processing of the dough to bread the formation of a moist bread of slippery consistency.

The homogenizing kneading process has to be executed with great intensity and speed so that in a period of time of less than one minute, preferably between about 10 and 40 seconds, the kneading process will be completed in such a manner as to have all water absorbed by the flour particles. By completing the kneading process in such short time of one minute or less, the dough is finished before formation of a gluten network or generation of fermentation gas has started.

Surprisingly it has been found that according to the present invention the quantity of water which can be included in the dough ingredients can be found by starting with the quantity of water which is to be added to the other dough ingredients according to the recipes of the prior art pertaining to batch-wise dough formation, and to add an additional quantity of water beyond the maximum amount of water indicated by the recipes and formulas pertaining to the prior art batch processes for forming a baking dough. It is important to compare the quantity of water which is to be embodied in the baking dough according to the method of the present invention with the quantities of water which could be included in the mixture from which a dough has been prepared by batch process because these batch processes and the formulae pertaining thereto are well known, while a practical, continuously operating dough kneading method so far was not available for practical operation.

It is well known that for the production of, for instance, various kinds of bread different quantities of water have to be used for the same amount of flour. As a rule according to German baking practice, for 100 kg. of flour used in the production of rye bread an average amount of about 62 liters of water is applied, in the case of wheat bread about 53 liters of water are used together with 100 kg. of flour, and in the case of mixed bread about 55 liters of water are used in combination with 100 kg. of flour. When it is attempted in the old process of kneading dough to increase the customary water constant of the various types of dough by for instance 5 liters of water per 100 kg. of flour, the result upon subsequent baking of the bread is always a moist bread of slippery consistency, poor storability, easily subject to mold formation and generally of a low quality which makes the same unsaleable.

Surprisingly it has now been found that according to the present invention the quantity of water can be increased by about 4 to 6 liters per 100 kg. of flour above the maximum quantity of water which can be incorporated into the dough according to the customary batch process formula. Preferably, according to the process of the present invention the quantity of water in the dough is increased by preferably 5 liters per 100 kg. of flour above the quantity indicated by the formulae applicable to batch kneading of dough. The thus increased relative quantity of water in the dough permits a quick and complete continuous homogenization of all dough ingredients in such a manner that each individual particle of the flour will absorb the quantity of water which is required for the subsequent decomposition and hydrolyzation of the flour particle, and on the other hand so that the finished dough does not contain any free un-absorbed water which would lead to the production of a slippery and moist bread.

Because of the great variances in the composition and physical characteristics of individual lots of flour, it is extremely difficult to define in absolute quantitative terms the amount of water which is to be included in the dough for each 100 kg. of flour in accordance with the method of the present invention. As stated further above, the amount of water to be embodied in the dough according to the present invention is higher by about between 4 and 6 liters per 100 kg. of flour than the amount of water which can be embodied into an otherwise similarly composed dough according to the processes and formulae of the prior art. According to a preferred embodiment of the process of the present invention, the amount of water to be included in the dough ingredients from which a dough is to be continuously produced according to the method of the present invention, is found by first determining the water absorption of 300 grams of flour in a farinograph by titrating the 300 gram flour sample in the farinograph with water until a maximum dough development of 500 Brabender units is obtained. The thus found amount of water is expressed as a percentage of the 300 grams of flour which were introduced into the farinograph. The amount of water which is to be introduced for each 100 kg. of flour according to the continuous dough making method of the present invention is then equal to the percentage figure determined in the farinograph whereby each percent corresponds to one kilogram of water, plus between about 4 and 6 kg. of water. Thus, if for instance the farinograph indicates a percentage amount of water of 59%, according to the present invention per 100 kg. of flour between 63 and 65 liters of water will be required. As stated further above, preferably approximately 5 liters of water are added in excess of the amount of water indicated by the farinograph test or by the formulae applicable to the batch processes. Thus, if the farinograph indicates a water percentage of 59%, preferably, according to the present invention, 64 liters of water are used per 100 kg. of flour.

The step of mixing the dough ingredients in a continuous mixing and kneading apparatus at such speed and with such intensity as to achieve complete mixing and homogenization of the dough ingredients within a period of less than one minute may be executed in any fully continuously operating mixing and kneading apparatus which is capable to completely homogenize the dough ingredients in the relative quantities indicated further above while the same pass through the continuous mixing apparatus in a period of less than one minute. It has been found that it is usually not possible to obtain complete homogenization within a period of less than about ten seconds. Excellent results can be obtained when the period of time during which the dough ingredients are kneaded into a dough ranges between about 15 and 40 seconds, this period of time being counted from the introduction of the dough ingredients into the continuous mixing apparatus to the time when the homogenized dough is removed from the apparatus.

Excellent results are for instance obtained with a continuous mixing apparatus such as is described in my co-pending application Serial No. 461,564, entitled "Apparatus for Making Bread and Pastry Dough." The capacity of the apparatus, i. e. whether for instance 1000 kg. or 5000 kg. of dough can be produced therein within one hour, depends primarily on the size of the kneading members. The kneading time, however, in accordance with the present invention is to be the same irrespective of the quantity of dough to be produced per hour, i. e. the kneading time is to be less than one minute, preferably between about 10 and 40 seconds. It is possible thereby to arrange the introduction of the ingredients of the dough into the continuous mixing apparatus in a fully automatic manner, so that the rate of continuous flow of the individual ingredients of the dough is adjusted so as to obtain the desired dough consistency and composition. Dough production of 1200 kg. of dough per hour can be obtained with an apparatus as described in my co-pending application Serial No. 461,564 which apparatus is approximately built as follows: A total of 12 kneading plates each having 12 apertures are provided. While it has been found that an assembly of kneading plates as described above gives excellent results, it must be stressed that the present invention is in no way limited to any specific assembly of such kneading plates or to any specific construction of the continuous mixing apparatus. The description of the apparatus herein is given as an example only. The diameter of the discharge opening is 109 millimeters, the diameter of the kneading plates 198 millimeters and the length of the kneading blades from one end thereof to the other end is 196 millimeters. The width of the kneading blades is 55 millimeters and the diameter of the main shaft on which the kneading blades and kneading plates are positioned is 44 millimeters. The kneading plates extend in axial direction through the second kneading means or homogenizing means of the apparatus for a length of 350 millimeters.

With an apparatus as described above complete homogenization can be obtained in a period of between about 15 and 40 seconds at about 115 revolutions per minute. When the number of revolutions per minute is increased, the homogenizing effect can be reduced with increased speed until with greatly increased speed no more homogenization takes place. In this connection it has to be understood that concurrently with the increase of the kneading speed also an increase of the kneading effect would have to be accomplished in order to obtain the desired homogenization. By just increasing the kneading speed without increasing the kneading effect or kneading intensity, the material to be kneaded passes through the kneading space too fast and is not exposed to the kneading action for sufficient lengths of time.

The adjustment of the kneading time for the individual types of dough to, for instance, 15 or 25 seconds or the like depends on the desired firmness of the dough in each case, i. e., whether the dough should be more soft or more firm, as well as on the type of the various other ingredients which are incorporated in the dough in addition to flour and water, such as for instance the addition of fat. It also depends on the type of flour, whether for instance a finely ground or a coarse flour is used. When including fat in the dough ingredients, it has to be considered that thereby the dough is made more pliable and under otherwise even conditions passes at greater speed through the kneading apparatus.

The specific dough consistency desired in each case can also be obtained by for instance increasing or decreasing the number of kneading plates and kneading blades in the apparatus.

Thus, according to the present invention, the quantity of water which is to be added to 100 kg. of flour in order to make a dough of a predetermined desired consistency is greater by between 4 and 6 liters than the quantity of water which can be added to 100 kg. of flour in order to produce a similar dough by the conventional batch method.

Generally, flour mills supply bakeries with flour of consistently even quality which makes it relatively simple for the baker to know what quantity of water has to be added to the flour in order to produce dough of desired consistency by conventional methods. According to the present invention, for each 100 kg. of flour an additional quantity of between 4 and 6 liters of water is to be added in excess of the known amount of water which can be added according to the conventional batch process.

If the amount of water is not known which can be added to 100 kg. of a certain flour in order to produce by the conventional batch method a dough of predetermined desired consistency, this conventional amount of water can for instance be determined with a farinograph. The amount of water to be added to 100 kg. of the flour according to the present invention is then between 4 and 6 liters, preferably 5 liters, greater than the amount indicated by the farinographic method.

The farinographic method can also be employed when additional ingredients besides flour and water are to be kneaded into a dough. In this case it is for instance possible to first determine in a farinograph the water absorption of the flour, and then to determine in a similar manner the water absorption of the flour plus other ingredients such as sugar, milk powder, etc. If it is then found that the flour plus other ingredients requires more water than the flour alone, the total quantity of water which is to be added according to the present invention per 100 kg. of flour will be the quantity of water absorbed by 100 kg. of flour alone, plus between 4 and 6 liters, plus the difference between the quantity of water required by 100 kg. of flour plus additional ingredients minus the quantity of water required by 100 kg. of flour alone.

If, for instance, the water absorption of flour alone is found according to the farinographic method to be 60 liters per 100 kg. of flour, and the water absorption of 100 kg. of flour plus additional ingredients is found to be 62 liters, then the total quantity of water to be added to 100 kg. of flour plus additional ingredients according to the present invention will be found to be 60 liters, plus 2 liters, plus between 4 and 6 liters, or a total of between 66 and 68 liters, which is between 4 and 6 liters more water than could have been added according to the conventional batch method in order to obtain a dough of similar consistency.

Thus, the method of the present invention can be executed for instance as follows:

All raw materials including the flour and water are continuously introduced in the mixing and kneading apparatus in small and measured proportionate amounts so as to obtain an even distribution of all raw materials in the mixing and kneading apparatus.

The mass which is thus introduced into the mixing and kneading apparatus is passed through the same and is thereby evenly and intensively kneaded so as to be completely homogenized when leaving the mixing and kneading apparatus.

The kneading and mixing apparatus may, for instance, comprise 12 kneading plates each having 12 apertures and 11 sets of kneading blades each having 3 blades.

The kneading blades may for instance rotate with 115 revolutions per minute, while the kneading plates may rotate in opposite direction with 10 revolutions per minute. Kneading time in this case may be 30 seconds.

Under the above-described conditions, 12 kneading plates each having 12 apertures will divide the mass into 144 strands, which by the pressure exerted by the kneading blades are again reunited, whereby the mass is thoroughly mixed and kneaded. In this manner, all of the individual particles of each of the various raw materials are forced into contact with individual particles of all of the other raw materials. 115 revolutions per minute will amount to about 58 revolutions during the kneading time of 30 seconds. Each kneading blade separates during each revolution 12 portions from the 12 dough strands passing through the preceding kneading plate. Under the above described conditions with 3 kneading blades per set of kneading blades and 11 sets of kneading blades, during 58 revolutions, 12 x 3 x 11 x 58 attacks on the mixture are made to which have to be added 144 kneading actions (12 kneading plates, each having 12 apertures) so that the mass is exposed within 30 seconds to a total of 23,112 intensive kneading actions. The kneading actions are expecially effective because the particles of the mass cannot escape the same such as is possible in the batch kneading process in which dough particles can escape laterally from the action of the kneading member.

Preferably, the apparatus in which the method of the present invention is performed can be heated by any suitable means such as electricity, steam or water, and also can be cooled in known manner, so that the temperature most favorable for the production of a specific dough can be maintained during the kneading process. The metal surfaces which are covered with a thin layer of flowing dough material are of high thermoconductivity. Frequently, it is desirable to maintain bread doughs at a temperature of between 28 and 32° C. and zwieback doughs at a temperature of about 36° C. during the kneading of the dough. It is advantageous to install a thermometer at the outlet end of the dough mixing and kneading apparatus in order to control the temperature of the dough. In this connection the friction heat produced during the kneading of the dough must be considered. This will amount for regular bread doughs to an increase of between 3 and 5° C., less for soft doughs and more for firm doughs. This must be taken into account when adjusting the heating or cooling of the dough mixing and kneading apparatus. Similarly, additions which affect the internal friction of the dough must be considered. For instance, additions of fat render the dough more pliable and reduce the amount of friction heat. For this reason, for instance, in the case of zwieback dough practically no friction heat is developed which fact has to be considered when adjusting the heating of the dough mixing and kneading apparatus.

According to the present invention, the kneading process and the ripening process are spaced in time from each other. Consequently, during the kneading process neither formation of the gluten network nor development of fermentation gases take place. The complete homogenization of the dough ingredients also results in a reduction of the otherwise required resting period which follows the kneading of the dough. Generally the resting period can be reduced to about half the length of time which previously was required. Surprisingly, it has also been found, when using the formulae and qualities of flour customary in Germany, that the resting period for many types of dough can be reduced to the relatively very short period of about 2 minutes. Since each individual flour particle is provided with the required amount of water, a practically complete gelatinization of all of the starch kernels in the dough is obtained, and consequently the bread made of such dough will remain fresh for considerably longer periods of time, for instance up to one week. Due to the complete gelatinization of all starch kernels, the dough is free of dry starch kernels in their original chemical and physical state. Consequently, the bread made of dough prepared according to the present invention has better taste, is more nourishing and easier digestible. In spite of the relatively greater amount of water which has been added to the dough according to the present invention, the bread is free of unbound water. The yield of bread per unit of flour is increased.

A dough prepared according to the present invention is characterized by its completely even structure and total homogeneity. The evenness and homogeneity of dough prepared according to the present invention is of special importance when the dough is to be baked in fully automatic ovens which cannot easily be adjusted for any deviations of the desired standard dough quality.

The following examples are given as illustrative only, the present invention however not being limited to the specific details of the examples.

Example 1

In this example the production of wheat bread according to the customary batch method of making dough and according to the method of the present invention are compared. German wheat flour having an ash content of 0.55% on a dry basis is used for the comparison experiments.

| Batch process | Continuous process according to the present invention |
|---|---|
| 100 kg. wheat flour | 100 kg. wheat flour. |
| 3.5 kg. yeast | 3.5 kg. yeast. |
| 1.5 kg. salt | 1.5 kg. salt. |
| 54 liters water | 59 liters water. |
| Kneading period: 15 minutes | Kneading period: 25 seconds. |
| Dough resting period: 25 minutes | Dough resting period: 2 minutes. |
| | Temperature: 28° C. |

The bread made from the continuously prepared dough compared favorably with the bread made from dough prepared by the batch process. Similar results were obtained according to the following examples.

Example 2

Similarly to Example 1, production of mixed bread from 60% wheat flour having an ash content on a dry basis 1.05%, and 40% rye flour having an ash content of 1.15%, by a batch dough making process and by the continuous dough making process of the present invention are compared.

| Batch process | Continuous process according to the present invention |
|---|---|
| 100 kg. flour mixture | 100 kg. flour mixture. |
| 20 kg. leaven | 20 kg. leaven. |
| 2 kg. yeast | 2 kg. yeast. |
| 1.5 kg. salt | 1.5 kg. salt. |
| 47 liters water | 52 liters water. |
| (Total water including water in leaven equal to 55 liters per 100 kg. flour.) | (Total water, including water in leaven equal to 60 liters per 100 kg. flour.) |
| Kneading period: 15 minutes | Temperature: 28° C. |
| Dough resting period: 20 minutes | Kneading Period: 30 seconds. |
| | Dough resting period: 2 minutes. |

Example 3

Production of black bread from rye grist having an ash content of 1.8%:

| Batch process | Continuous process according to the present invention |
| --- | --- |
| 100 kg. rye grist | 100 kg. rye grist. |
| 40 kg. leaven | 40 kg. leaven. |
| 1.5 kg. salt | 1.5 kg. salt. |
| 48 liters water | 54 liters water. |
| (Total water including water in leaven equal to 62 liters per 100 kg. flour.) | (Total water including water in leaven equal to 67 liters per 100 kg. flour.) |
| Kneading period: 25 minutes | Kneading period: 28 seconds. |
| Dough resting period: 20 minutes | Dough resting period: 2 minutes. Temperature: 30° C. |

Example 4

Production of wheat bread from American wheat flour of high gluten content.

| Batch process (with U. S. A. high speed mixer) | Continuous process according to the present invention |
| --- | --- |
| 100 kg. wheat flour | 100 kg. wheat flour. |
| 3.5 kg. yeast | 3.5 kg. yeast. |
| 1.5 kg. salt | 1.5 kg. salt. |
| 63 liters water | 69 liters water. |
| Kneading period: 3½ minutes | Kneading period: 20 seconds. |
| Dough resting period: 70 minutes | Dough resting period: 35 minutes. Temperature: 28° C. |

As it is well known according to the customary methods of making dough, the dough is sub-divided into individual dough portions after being first allowed to rest for a certain period of time. By using a continuous dough kneading apparatus such as for instance described in my co-pending application Serial No. 461,465, it is possible to sub-divide the dough leaving the continuous dough kneading apparatus in the shape of a rope, immediately at the discharge opening of the dough kneading apparatus. Thus, it is possible according to the process of the present invention to sub-divide the dough rope already prior to the start of the formation of the gluten network and prior to the start of fermentation processes. It is preferred, according to the present invention, to sub-divide the continuously formed rope of baking dough immediately after completion of the kneading of the same, i. e., when the dough leaves the continuous mixing apparatus. It is a further advantage of the process of the present invention that the temperature within the continuous dough mixing and kneading apparatus can be adjusted during the process of mixing and homogenizing the dough therein, by cooling or heating of the apparatus so as to obtain at all times the temperature which is most advantageous for the production of dough from the specific dough ingredients employed. In many cases it is preferred to adjust the temperature in the continuous dough mixing apparatus to the temperature which is most favorable during the dough resting period subsequent to the kneading of the same, such as a temperature of between 28° and 32° C.

It is preferred to maintain the dough ingredients and the dough formed therefrom at a substantially constant temperature during the mixing and homogenizing of the same. It is well known that the quality of a dough depends to a considerable extent on the temperature maintained during the kneading of the dough. According to the method of the present invention it is possible by using suitable and well known heating or cooling devices, to maintain the dough temperature closely at the desired optimum temperature for any specific dough. This could not be accomplished in the large dough kneading vats employed in the customary batch dough kneading processes. Different portions of dough simultaneously within such vats show varying temperatures since the quantity of dough in the vat is too large to permit even heating or cooling. However according to the method of the present invention only relatively small quantities of dough are kneaded at any given time and the temperature of such small quantity of dough ingredients and dough can be closely controlled.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing dough, comprising the step of subjecting flour together with a quantity of an aqueous liquid sufficient to hydrolyze all of the starch granules of said flour for a period of less than one minute to intensive kneading action so as to transform said flour and said liquid during said period into a homogeneous dough, whereby the homogeneous condition of the thus produced dough is substantially reached prior to formation of a gluten network and the development of fermentation gas in said dough, said kneading action being carried out with such intensity that during said period substantially each starch granule in said flour is brought in contact with a quanity of water sufficient for hydrolyzation of said starch granule.

2. A method of continuously producing dough, comprising the step of subjecting successive portions of flour together with successive quantities of an aqueous liquid sufficient to hydrolyze all of the starch granules of said flour for a period of less than one minute to intensive kneading action so as to continuously transform said successive portions of flour and said successive portions of liquid during said period into a homogeneous dough, whereby the homogeneous condition of the thus continuously produced dough is substantially reached prior to formation of a gluten network and the development of fermenation gas in said dough, said kneading action being carried out with such intensity that during said period substantially each starch granule in said flour is brought in contact with a quantity of water sufficient for hydrolyzation of said starch granule.

3. A method of continuously producing dough, comprising the step of subjecting successive portions of flour together with successive portions of water sufficient to hydrolyze all of the starch granules of said flour, and other dough ingredients for a period of less than one minute to intensive kneading action so as to continuously transform said successive portions of flour and said successive portions of liquid during said period into a homogeneous dough, whereby the homogeneous condition of the thus continuously produced dough is substantially reached prior to formation of a gluten network and the development of fermentation gas in said dough, said kneading action being carried out with such intensity that during said period substantially each starch granule in said flour is brought in contact with a quantity of water sufficient for hydrolyzation of said starch granule.

4. A method of continuously producing dough, comprising the step of subjecting successive portions of flour together with successive quantities of an aqueous liquid sufficient to hydrolyze all of the starch granules of said flour for a period of between 10 seconds and 40 seconds to intensive kneading action so as to continuously transform said successive portions of flour and said successive portions of liquid during said period into a homogeneous dough, whereby the homogeneous condition of the thus continuously produced dough is substantially reached prior to formation of a gluten network and the development of fermentation gas in said dough, said kneading action being carried out with such intensity that during said period substantially each starch granule in said flour is brought in contact with a quantity of water sufficient for hydrolyzation of said starch granule.

5. A method of continuously producing dough, comprising the step of subjecting successive portions of flour together with successive quantities of an aqueous liquid sufficient to hydrolyze all of the starch granules of said flour for a period of less than one minute to intensive kneading action at a predetermined optimum dough-forming temperature so as to continuously transform said successive portions of flour and said successive portions of liquid during said period into a homogeneous dough, whereby the homogeneous condition of the thus continuously produced dough is substantially reached prior to formation of a gluten network and the development of fermentation gas in said dough, said kneading action being carried out with such intensity that during said period substantially each starch granule in said flour is brought in contact with a quantity of water sufficient for hydrolyzation of said starch granule.

6. A method of continuously producing dough, comprising the step of subjecting successive portions of flour together with successive quantities of an aqueous liquid sufficient to hydrolyze all of the starch granules of said flour for a period of less than one minute to intensive kneading action at a predetermined substantially constant temperature so as to continuously transform said successive portions of flour and said successive portions of liquid during said period into a homogeneous dough, whereby the homogeneous condition of the thus continuously produced dough is substantially reached prior to formation of a gluten network and the development of fermentation gas in said dough, said kneading action being carried out with such intensity that during said period substantially each starch granule in said flour is brought in contact with a quantity of water sufficient for hydrolyzation of said starch granule.

7. A method of continuously producing dough, comprising the step of subjecting successive portions of flour together with successive quantities of an aqueous liquid sufficient to hydrolyze all of the starch granules of said flour for a period of less than one minute to intensive kneading action so as to continuously transform said successive portions of flour and said successive portions of liquid during said period into a homogeneous dough; and subdividing the thus continuously formed dough into individual baking portions within one minute from the start of said kneading action on the flour and liquid portions of which each individual baking portion, respectively, is formed, whereby the homogeneous condition of the thus continuously produced individual baking portions is substantially reached prior to formation of a gluten network and the development of fermentation gas in said dough, said kneading action being carried out with such intensity that during said period substantially each starch granule in said flour is brought in contact with a quantity of water sufficient for hydrolyzation of said starch granule.

8. A method of continuously producing bread and baking dough, comprising the step of subjecting successive portions of flour together with successive portions of water sufficient to hydrolyze all of the starch granules of said flour, and other dough ingredients for a period of between 10 seconds and 40 seconds to intensive kneading action at a predetermined optimum dough-forming temperature so as to continuously transform said successive portions of flour and said continuous portions of liquid during said period into a homogeneous dough, whereby the homogeneous condition of the thus continuously produced dough is substantially reached prior to formation of a gluten network and the development of fermentation gas in said dough, said kneading action being carried out with such intensity that during said period substantially each starch granule in said flour is brought in contact with a quantity of water sufficient for hydrolyzation of said starch granule.

9. A method of continuously producing dough, comprising the step of subjecting successive portions of flour together with successive quantities of an aqueous liquid sufficient to hydrolyze all of the starch granules of said flour for a period of between 10 seconds and 40 seconds to intensive kneading action at a predetermined substantially constant temperature so as to continuously transform said successive portions of flour and said successive portions of liquid during said period into a homogeneous dough; and subdividing the thus continuously formed dough into individual baking portions within one minute from the start of said kneading action on the flour and liquid portions of which each individual baking portion, respectively, is formed, whereby the homogeneous condition of the thus continuously produced individual baking portions is substantially reached prior to formation of a gluten network and the development of fermentation gas in said dough, said kneading action being carried out with such intensity that during said period substantially each starch granule in said flour is brought in contact with a quantity of water sufficient for hydrolyzation of said starch granule.

References Cited in the file of this patent

UNITED STATES PATENTS

| | | |
|---|---|---|
| 509,987 | Wilcox | Dec. 5, 1893 |
| 617,866 | Somasco | Jan. 17, 1899 |
| 1,790,347 | Hawkins | Jan. 27, 1931 |
| 2,547,566 | Cohoe | Apr. 3, 1951 |